US010416610B2

(12) United States Patent
Buttet

(10) Patent No.: US 10,416,610 B2
(45) Date of Patent: Sep. 17, 2019

(54) WATCH WITH A DECORATIVE ELEMENT

(71) Applicant: HUBLOT S.A., GENEVE, Geneva (CH)

(72) Inventor: Mathias Buttet, Aubonne (CH)

(73) Assignee: HUBLOT S.A., GENEVE, Geneva (CH)

( * ) Notice: Subject to any disclaimer, the term of this patent is extended or adjusted under 35 U.S.C. 154(b) by 0 days.

(21) Appl. No.: 15/118,554

(22) PCT Filed: Feb. 26, 2015

(86) PCT No.: PCT/EP2015/054097
§ 371 (c)(1),
(2) Date: Aug. 12, 2016

(87) PCT Pub. No.: WO2015/132139
PCT Pub. Date: Nov. 11, 2015

(65) Prior Publication Data

US 2017/0031321 A1 Feb. 2, 2017

(30) Foreign Application Priority Data

Mar. 5, 2014 (CH) ...................................... 0319/14

(51) Int. Cl.
*G04B 45/02* (2006.01)
*G04B 45/00* (2006.01)
(Continued)

(52) U.S. Cl.
CPC ......... *G04B 45/0076* (2013.01); *G04B 19/06* (2013.01); *G04B 19/10* (2013.01);
(Continued)

(58) Field of Classification Search
CPC .... G04B 45/0076; G04B 19/12; G04B 19/06; G04B 19/10; G04B 45/0015; G04B 45/0069; G04B 37/22
See application file for complete search history.

(56) References Cited

U.S. PATENT DOCUMENTS 3,427,797 A * 2/1969 Negoro .................. G04C 10/02
136/249
4,534,660 A 8/1985 Laesser
(Continued)

FOREIGN PATENT DOCUMENTS

CH 666 380 A3 7/1988
CH 680329 A3 8/1992
(Continued)

OTHER PUBLICATIONS

Bracket—dictionary.com Dec. 4, 2018.*
(Continued)

*Primary Examiner* — Sean P Kayes
(74) *Attorney, Agent, or Firm* — Westerman, Hattori, Daniels & Adrian, LLP

(57) ABSTRACT

A decorative element for watches, comprising: a framework comprising arms (12) delimiting a plurality of decorative areas (Zi) and forming support elements, and a plurality of decorative components (20) fixed to the arms of the skeleton, each decorative component occupying a decorative area.

22 Claims, 2 Drawing Sheets

(51) Int. Cl.

| | |
|---|---|
| ***G04B 19/06*** | (2006.01) |
| ***G04B 19/10*** | (2006.01) |
| ***G04B 19/12*** | (2006.01) |
| ***G04B 37/22*** | (2006.01) |

(52) U.S. Cl.

CPC ............. *G04B 19/12* (2013.01); *G04B 37/22* (2013.01); *G04B 45/0015* (2013.01); *G04B 45/0069* (2013.01)

(56) References Cited

U.S. PATENT DOCUMENTS

| | | | | |
|---|---|---|---|---|
| 6,907,753 | B2 * | 6/2005 | Lieberman | A44C 17/0216 63/26 |
| 7,839,727 | B2 | 11/2010 | Buttet et al. | |
| 9,355,124 | B2 * | 5/2016 | Horiuchi | G01N 21/87 |
| 2002/0096167 | A1 * | 7/2002 | Shuto | A44C 17/001 125/30.01 |
| 2003/0121282 | A1 * | 7/2003 | Lieberman | A44C 17/0216 63/29.1 |
| 2008/0137487 | A1 | 6/2008 | Buttet et al. | |
| 2009/0070273 | A1 * | 3/2009 | Moryto | G06Q 10/087 705/80 |
| 2012/0243387 | A1 * | 9/2012 | Jamin | G04B 5/16 368/151 |
| 2016/0070723 | A1 * | 3/2016 | Horiuchi | G01N 21/87 235/375 |

FOREIGN PATENT DOCUMENTS

| | | | |
|---|---|---|---|
| CH | 699 165 | B1 | 1/2010 |
| CN | 101036089 | A | 9/2017 |
| EP | 0 131 267 | A1 | 1/1985 |
| FR | 606 623 | A | 6/1926 |

OTHER PUBLICATIONS

Lateral—dictionary.com Dec. 4, 2018.*

Shape—dictionary.com Dec. 4, 2018.*

International Search Report and Written Opinion dated Aug. 17, 2015 issued in corresponding application No. PCT/EP2015/054097; w/ English partial translation and partial machine translation (18 pages).

Chinese Office Action dated May 30, 2018 in counterpart CN application No. 201580011659.X (with English machine translation; 18 pages).

* cited by examiner

WATCH WITH A DECORATIVE ELEMENT

INTRODUCTION

The present invention relates to a decorative element for a watch and to a watch as such incorporating such a decorative element. The invention also relates to a method for manufacturing a decorative element and to a method for manufacturing a watch incorporating such a decorative element. Finally, the invention relates to a series of watches with decorative elements, and to a method for manufacturing such a series of watches.

PRIOR ART

There are in the prior art a number of approaches that can be taken in order to decorate a watch. First of all, it is possible to decorate an accessory of the watch, which means to say a part such as a strap or strap clasp. Next, it is possible to decorate the watch itself, such as the watch case or the display zone, for example using a special dial with a worked appearance. Finally, other, indirect, approaches involve making part of the clock mechanism, such as a tourbillon for example, visible, so as to give the watch an attractive appearance.

In all these solutions, a decoration may potentially be unique in the case of very short production series that are manufactured entirely by hand. In such cases, such decoration is generally sophisticated and incompatible with an industrially mass-produced series. On the other hand, in the case of a series of watches that have been mass-produced using an industrial method, which is at least partially automated, the same decoration is reproduced identically on all the watches in the series, which are identical. Very short production series are generally very expensive and inaccessible to the general public who have to content themselves with choosing a watch from a mass-produced series, thus losing the satisfaction of possessing a watch that is unique.

This is why the overall object of the invention is a decorative solution for watches that provides a solution to this problem.

More specifically, a first object of the invention is to propose a decorative solution for watches that makes it possible to offer a multitude of possible decoration variants in order to make the varied and preferably unique decoration of watches compatible with the mass-production of watches on an industrial scale.

It is a second object of the invention to propose a decorative solution for a watch that is attractive and easy to implement.

BRIEF DESCRIPTION OF THE INVENTION

To this end, the invention relies on a decorative element for watches, characterized in that it comprises a skeleton comprising arms delimiting several decorative zones and forming support elements, and in that it comprises several decorative components fixed to the arms of the skeleton, each decorative component occupying one decorative zone.

The invention also relates to a watch comprising one or more decorative element(s).

The invention is precisely defined by the claims.

BRIEF DESCRIPTION OF THE FIGURES

These objects, features and advantages of the present invention will be set out in detail in the following description of some particular embodiments given by way of nonlimiting example with reference to the attached figures among which.

To simplify the description that follows, any direction in a plane parallel to the plane of the dial of the watch will be referred to as a horizontal orientation and any direction perpendicular to this plane of the dial of the watch will be referred to as a vertical orientation. The side of the watch above the clock movement, where the dial is notably situated, will be referred to as the upper side and the side underneath the clock movement, where the back of the watch is situated, will be referred to as the lower side.

Figure 1:
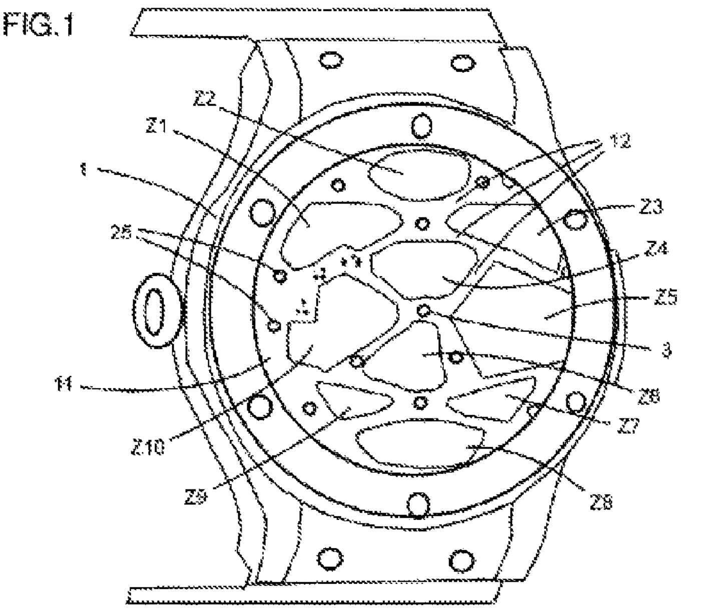
FIG. 1 depicts a schematic view of a watch incorporating a decorative element according to one embodiment of the present invention.

FIG. 1 by way of example illustrates a watch according to one embodiment of the invention. This watch comprises a case 1 incorporating a clock mechanism setting in motion hands which have not been depicted in order to make the view simpler, about a central axis 3 as is known from the prior art. This watch additionally incorporates a decorative element which occupies the entire surface of the dial, is arranged in a horizontal plane arranged between the hands and the clock mechanism, on the upper side of the watch, and is visible to the user when he looks at the time. This decorative element in this instance forms the dial of the watch. As an alternative, it could form just part of the dial, or could even be an element that complements a dial, being located, for example, at least partially above the dial. In any event, the decorative element is visible from the outside, preferably through a protective glass arranged in the known way at the top of the watch.

The decorative element comprises a skeleton taking the form of a metal framework which comprises a substantially circular peripheral part 11 corresponding to the inside diameter of the watch case and which comprises somewhat slender arms 12 that are not very visible, if visible at all, which extend across the surface of the dial, breaking down this watch surface into several decorative zones Zi, ten zones Z1 to Z10 in this embodiment. Note that the peripheral part 11 may cover the entire contour or just part of the contour of the watch. Each of these decorative zones Zi is surrounded, either completely or partially, by arms 12 and/or peripheral parts 11 of the skeleton forming a support to accept a decorative component 20, preferably in the form of a thin platelet, fixed to the skeleton. Naturally, this decorative element may be adapted to suit any format of watch, not necessarily circular, for example rectangular, square, elliptical, etc., in which case the peripheral part will have a shape substantially identical to all or part of the interior contour of the watch.

Figure 2:
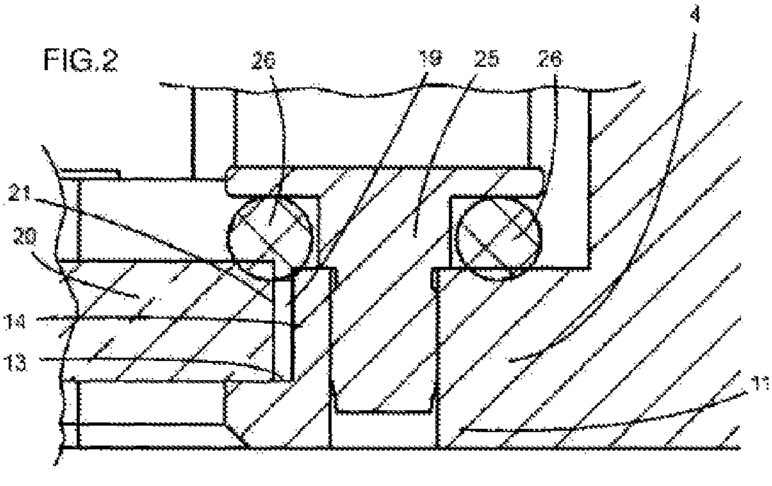
FIG. 2 depicts a view in cross section in a region of fixing of a decorative component of a watch incorporating a decorative element according to one embodiment of the present invention.
Figure 3:
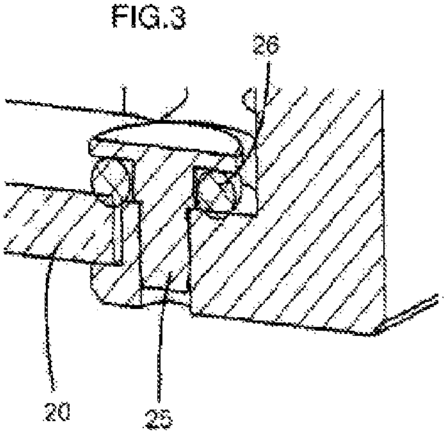
FIGS. 3 and 4 depict perspective views from right and left and in cross section in the region of a decorative-component fixing zone of a watch incorporating a decorative element according to the embodiment of the present invention.
Figure 4:
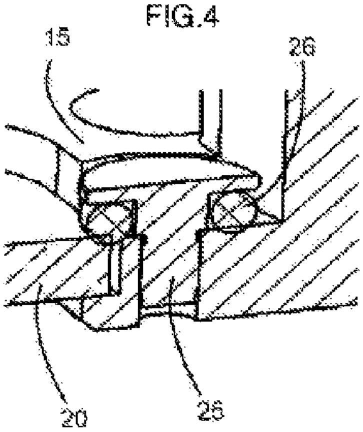

By way of exemplary embodiment, FIGS. 2 to 4 show how the decorative element collaborates with the rest of the watch at a fixing element that fixes a decorative component 20. In this example, the skeleton of the decorative element is formed directly within the mainplate 4 of the watch, for example by perforating a standard mainplate and forming support elements at the resulting arms. As an alternative, the skeleton may be formed in a bridge of the watch, in a dial, or even in an oscillating mass.

As can be seen from FIGS. 2 to 4, the skeleton comprises parts forming support elements and/or forming a housing for a decorative component. In these figures, a peripheral part 11 of the skeleton (the mainplate 4) has the cross section of a couched U, forming a groove facing in a substantially horizontal direction to accept the end of the decorative component. In the cross section in FIG. 2, the upper surface 15 of the groove has been cut off, as can be seen more particularly in FIG. 4, in order to introduce a fixing pin 25. Thus, the U-shaped cross section is reduced to an angle bracket section comprising a first support surface 13 that is horizontal and substantially planar (the lower surface of the groove), intended to accept a decorative component 20, and a second surface 14 substantially perpendicular thereto forming a lateral end stop for the end 21 of the decorative component 20 (and also to connect the two horizontal surfaces of the couched U, these being the lower support surface 13 and the upper surface 15). This second surface 14 advantageously has a height substantially equal to, and preferably slightly greater than, the thickness of the decorative component 20 in order best to guarantee protection thereof and allow it to be housed with sufficient clearance in the vertical direction.

In addition, sufficient lateral clearance 19 is provided between the lateral end 21 of the decorative component 20 and the rim of the housing in the skeleton (the surface 14) in order to allow the decorative component to expand without placing any load thereon, as this could break or damage it. The skeleton therefore has a shape that allows it to accept a decorative component, so as to support and position a decorative component.

The arms 12 of the skeleton, which are arranged in the central part of the watch, may accept two decorative components, one on each side. For that, they have two support surfaces 13 belonging to two opposed horizontal grooves arranged around a common vertical central portion. This supporting function of the skeleton is preferably present along the entire length of the arms 12 and of the peripheral parts 11, but as an alternative could be present on just part of this length, an arm 12 having, for example, a simplified (notably grooveless) cross section on the other parts. As an alternative, the supporting function of the skeleton may be provided using any other geometry, such as a simple support surface on which the decorative component rests.

The skeleton may be made of metal or, as an alternative, of any relatively rigid structure such as a composite plastic, for example a fiber-reinforced, such as carbon-fiber-reinforced, plastic etc.

As has just been explained, the decorative component 20 according to the embodiment takes the form of a thin platelet, the lower surface of which therefore comes to bear against the support surfaces of the skeleton. It is then held in place by pins 25 driven into the skeleton (the mainplate 4 in the example illustrated), applying pressure to the upper surface of the decorative component 20 via the intermediary of damping seals 26. These seals 26 may be made of a flexible material such as a rubber, a silicone a synthetic material or even a soft metal. Their purpose is to hold the decorative components 20 vertically and horizontally while allowing the load from the pins 25 to be transmitted and eliminating any play, without the risk of damaging the decorative components which are fragile.

As an alternative, any other mechanical or otherwise fixing mechanism can be used, such as the use of screws or bonding. For preference, at least three fixing points are used per decorative component, these being obtained for example using three pins according to the embodiment, so as to obtain reliable and play-free retention. Furthermore, these various fixing points are preferably evenly distributed around the periphery of the decorative component 20, for example every 120 degrees if it is three fixing points that are provided.

Note that this decorative-component fixing device is thus removable, allowing a decorative component to be removed and replaced if necessary.

The decorative component 20 represents the element particularly visible from the outside of the watch. It may be embodied in a multitude of various ways, including:

- a colored ceramic element, for example a platelet made of glass colored by the incorporation of metallic particles, leaving it translucent or transparent, so as to obtain an interesting esthetic effect when illuminated with light from the outside and/or from the inside. This advantageously allows ceramics/glasses of different colors to be grouped together in adjacent decorative zones to form an assembly similar to a stained-glass window. As an alternative, this solution may be combined with a light source internal to the watch, arranged beneath the decorative element, and/or an internal light-reflecting surface;
- an opaque element, set with precious or semiprecious stone and/or with mother of pearl, made of metal, in the form of platelets of different crystals, of colored ceramic, of semiprecious stone such as jade, tourmaline, amethyst, citrine, and fine stones of the aquamarine type, but also in the form of meteorite platelets, etc;
- an element made of polymer material;
- a mineral, plant or animal element;
- an element made of a phosphorescent or luminescent material, possibly coupled with a light source internal to the watch;
- a dynamic element, which means to say an element capable of changing appearance with time, for example in the form of an LCD screen powered by a power source internal to the watch. Such an approach means that the stained-glass window effect can be altered over time. It also allows the decorative element to be animated.

Figure 5:
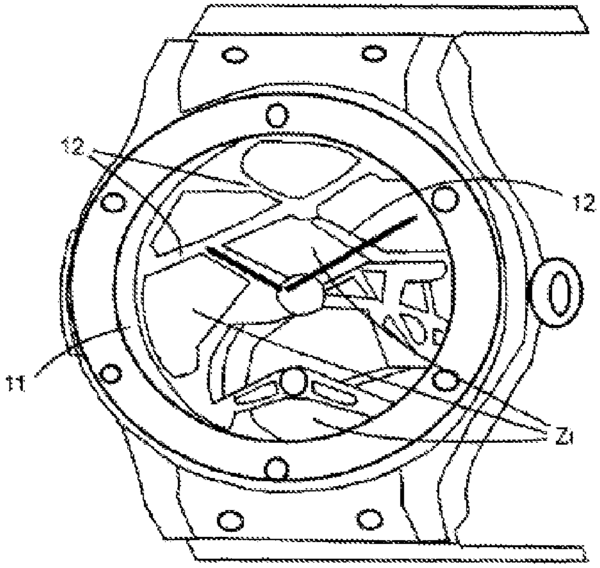
FIG. 5 is a schematic view of a watch incorporating a decorative element according to another embodiment of the present invention.

Naturally, the invention does not relate to the aesthetic appearance itself but relates to the solution for decorating a watch. Thus, the skeleton, the decorative zones and the decorative components may adopt any form and/or be made of any other material. To this end, FIG. 5 depicts an alternative form of the embodiment in which the skeleton and, therefore, the decorative zones, has a different form.

Moreover, the skeleton can be made to be non-visible or visible, may form a monolithic assembly indissociable from the mainplate, a bridge, a dial or an oscillating mass of the watch or may be a distinct component, in the form of any attached plate, fixed for example to the mainplate or to a bridge. It may also take the form of a number of distinct pieces. It may take the form of a substantially planar, or curved, continuous or discontinuous surface, by connecting-together several parts in different planes, for example forming steps between them.

As an alternative, the decorative components may adopt some shape other than a platelet, and may for example have an upper and/or lower surface that is nonplanar, for example curved, in order to introduce special optical effects. Thus, the housings made in the skeleton to support a decorative component and/or, more simply, support surfaces, may be planar, inclined, curved, etc.

As an alternative, a similar decorative structure may appear on the side of the watch. It may therefore be oriented in a substantially perpendicular direction.

In addition, several decorative elements may be arranged within one and the same watch, notably on an upper side and on a lower side, for example visible from the underside of the watch. Such a construction may offer the advantage of making it possible to create complementary esthetic effects by combining transparent or translucent decorative components with other reflective decorative components. In particular, such an upper decorative element may be transparent and/or translucent and a lower decorative element may be reflective, comprising "mirror" decorative components. Thus, the light enters the watch via the upper surface thereof, is reflected by the lower decorative element and returns to the upper decorative element in which a stained-glass window effect may thus ideally be showcased.

The invention also relates to a method of manufacturing such a watch with decorative element, which comprises the following steps:

- manufacturing a skeleton, either on an independent plate or directly within a mainplate, a bridge, a dial or an oscillating mass of a watch. In these latter instances, this step may comprise a substep of perforating said component of the watch to form slender arms with support means;
- fixing several decorative components to the skeleton.

The decoration solution described hereinabove naturally makes it possible to differentiate the appearance of the various watches of one and the same production series. Specifically, it is possible to do a production run to produce a series containing a multitude of watches, all incorporating the same clock mechanism, the decoration skeleton but differing only in terms of the decorative components used.

Advantageously, this principle is used to manufacture a series of watches using an industrial process, by choosing decorative components such that each watch in the series is unique. For that, the decoration method comprises a step of coding the decoration, on the basis of the decorative components selected, in order to guarantee the uniqueness of each watch, which then receives a specific decoration code.

In order to illustrate this principle, let us consider the example of the watch of FIG. 1 and let us suppose that we have available to us for each decorative zone defined by the skeleton ten different colors of decorative component made of colored glass. Because the skeleton chosen forms ten decorative zones on the surface of the watch, that gives $10^{10}$ possible combinations. It is thus evident that the decorative principle makes it possible to form a multitude of watches that differ in terms of their decoration according to the invention.

In order to guarantee the uniqueness of each watch in the series, the following coding is chosen according to the embodiment. First of all, a unique numeral between 0 and 9 is associated with each of the ten possible colors. Next, the decorative zones Z1 to Z10 are considered in an order chosen by convention, and for each decorative zone Zi a color code is associated, in order to form the watch decoration code.

By way of example, let us select the following coding for the colors:

0=yellow
1=purple
2=blue

3=green
. . .
9=red

If the decorative element has the following composition:

Zone Z1: red (code 9)
Zone Z2: purple (code 1)
Zone Z3: red (code 9)
Zone Z4: blue (code 2)
Zone Z5: green (code 3)
Zone Z6: red (code 9)
Zone Z7: yellow (code 0)
Zone Z8: blue (code 2)
Zone Z9: red (code 9)
Zone Z10: yellow (code 0)

Then the decoration code for this decorative element can be written by taking the color codes in the order of the decorative zones Zi to obtain, in this example, the code: 9192390290.

Such a code therefore does indeed represent a unique way of having a specific decoration.

This coding makes it possible to ensure that each watch is unique, by using each decoration code just once. To do that, the method of manufacturing a series of watches comprises a step of assigning to the watch a decoration code that is available, which means to say that has not yet been used, in order to manufacture the watch corresponding to this decoration code. It then involves a step of memorizing this decoration code as being no longer available, before assigning a distinct decoration code to the next watches. This method means that an entire series of at most $p^n$ watches, all different, can be manufactured taking care to use each decoration code just the once, where there are p possibilities for decorative components for each decoration zone in a watch comprising n decorative zones.

This coding is handled automatically, by any computer associated with the manufacturing device, on which a software code is executed, and is associated with an electronic memory containing at least one file of available and/or unavailable decoration codes.

If the watches in a series comprise several decorative elements, each of these elements will be defined by a decoration code. The uniqueness of the watch will be achieved by comparing the decorative elements of each watch which are positioned in the same place within the watch. An overall decoration code for each watch may then combine the decoration codes for each decoration element, keeping the order in which these codes appear: for example first of all the code for the upper decoration element, then that for the lower decorative element.

Naturally, the coding chosen hereinabove has been explained in detail by way of example. Any other convention that makes it possible to identify each watch decoration uniquely may be suitable as an alternative. Thus, the decoration defined hereinabove makes it possible to achieve the surprising effect of being able to manufacture unique series components in the field of high end horology.

As an alternative, the method of manufacturing a series of watches may comprise a step of eliminating certain decoration codes on the basis of esthetic criteria, in order to avoid manufacturing watches with decorations that correspond to combinations that would not prove sufficiently attractive. To do that, this elimination consists in memorizing these codes as being unavailable, before allocating decoration codes to the watches that are to be manufactured.

Furthermore, the invention does not relate to the form of the decoration skeleton itself; however, in order to obtain an attractive appearance, in the form of a stained-glass window, or even in the form of a patchwork of stained-glass elements, in the art deco style or, more generally, a patchwork of different decorative components, it is advantageous to choose at least five decorative zones, or at least seven. This number of decorative components can be distributed across one and the same decorative element or across a number of decorative elements of one and the same watch. In addition, the decorative element does not necessarily have to extend across the entire surface of the watch or of the dial, but it is advantageous for it to extend over at least 40%, or at least 60%, of this surface area.

As was explained before, the decorative components may be varied. In one alternative form, one (or more) decorative zone may remain free of any decorative component, or may even be occupied by transparent glass, so as to reveal parts of the clock mechanism, for example a tourbillion. In addition, the decorative components may be any, but it is advantageous to use several different components, notably at least five or even seven components that differ in terms of their material and/or their color, in order to form a particularly attractive artistic appearance. These different decorative components mentioned are preferably on the same decorative element.

The decorative element described hereinabove is particularly well suited to decorating a watch, as has been seen, notably a wrist watch. As an alternative, it can be implemented on any kind of watch.

The invention claimed is:

1. A watch comprising:

a case incorporating at least one of a mainplate and bridges, a clock mechanism, and a decorative element located in the case, wherein the decorative element comprises a skeleton extending along a main plane and comprising elongated arms delimiting several openings configured to form decorative zones, the openings passing through the skeleton in a direction perpendicular to the main plane of the skeleton from a first main surface of the skeleton to a second main surface of the skeleton opposed to the first main surface, wherein the openings are surrounded by the elongated arms, and a plurality of decorative components fixed to the arms of the skeleton, each of the decorative components occupying a respective one of a plurality of openings among the several openings, each of the respective decorative components having a platelet shape and occupying substantially a totality of the opening, wherein each of the openings of the plurality of openings comprises at least one support element protruding from one of the elongated arms into the respective opening, so as to form an angle bracket having a first support surface extending parallel to a main plane of the skeleton on which the decorative component occupying the respective opening rests so that a lower surface of the decorative component bears against the first support surface of the angle bracket, second surface forming a lateral end stop for the decorative component, and at least three fixing elements distributed around a periphery of each of the decorative components and applying pressure on an upper surface of the decorative component, wherein the fixing elements are removable so as to allow removing the decorative component from the skeleton.

2. The watch as claimed in claim 1, wherein the arms of the skeleton comprise a housing to support a decorative component.

3. The watch as claimed in claim 1, wherein each decorative component has a form of a decorative zone delimited by at least one of (i) at least one of the arms and (ii) a peripheral part of the skeleton so as to occupy an entire surface of the decorative zone.

4. The watch as claimed in claim 1, comprising several decorative components made from a material chosen from the group consisting of ceramic, glass, polymers, mother of pearl, metals, minerals, a material forming a plant structure, a material forming an animal structure, phosphorescent or luminescent materials, and materials forming an LCD screen.

5. The watch as claimed in claim 1, comprising at least one of (i) several different decorative components fixed to the skeleton, made of a colored transparent or translucent material so as to form a stained-glass window effect, and (ii) several decorative components that are reflective so as to reflect light.

6. The watch as claimed in claim 1, wherein the skeleton comprises at least five openings and the decorative element comprises at least five decorative elements, wherein each of the decorative components is different from the other decorative components in size, shape, material and/or color.

7. The watch as claimed in claim 1, wherein a surface area of the decorative element is greater than or equal to 40% of a surface area of the watch dial.

8. The watch as claimed in claim 7, wherein the surface area of the decorative element is greater than or equal to 60% of the surface area of the watch dial.

9. The watch as claimed in claim 1, wherein the at least five decorative components include decorative components that are transparent or translucent so as to form a stained-glass window effect.

10. The watch as claimed in claim 9, further comprising a mirror decorative component fixed to the case, wherein the mirror decorative component is located on an opposite side of the decorative element relative to a glass of the watch.

11. The watch as claimed in claim 1, comprising at least one other decorative element comprising a skeleton comprising arms delimiting at least five decorative zones and forming support elements on which at least five decorative components are fixed, wherein each of the decorative components of the other decorative element is different from the other decorative components of the other decorative element, wherein one of the decorative elements is on an upper side of the watch and the other of the decorative elements is on a lower side of the watch.

12. The watch as claimed in claim 11, wherein (i) a first one of the decorative elements is on a first side of the watch, the first decorative element comprising decorative components that are transparent or translucent and (ii) a second one of the decorative elements is on a second side of the watch opposite to the first side, the second decorative element comprising decorative components that are reflective.

13. The watch as claimed in claim 1, wherein at least one of (i) at least one element selected from the group consisting of the mainplate, at least one of the bridges, a dial, and an oscillating mass of the watch, forms a skeleton for at least one of the decorative elements, and (ii) a skeleton for at least one of the decorative elements of the watch forms an attached plate separate from a movement of the watch.

14. The watch as claimed in claim 13, comprising a decorative element the skeleton of which forms an attached plate which comprises elements for fixing the skeleton to at least one of the mainplate and the bridges of the watch.

15. The watch as claimed in claim 1, wherein the first support surface of each of the plurality of openings forms at least three support points for the respective decorative component.

16. The watch as claimed in claim 1, wherein each of the fixing elements rests against the decorative component via at least one flexible seal.

17. The watch as claimed in claim 1, comprising at least one of (i) a surface that reveals part of a clock mechanism, and (ii) an internal light source.

18. A series of watches comprising several watches as claimed in claim 1, each of the watches differing from the other watches of the series, wherein at least one of the decorative elements of each of the watches, across the entire series, is unique.

19. A method of manufacturing a watch as claimed in claim 1, comprising:

manufacturing a skeleton;

fixing several decorative components onto the skeleton, and placing the skeleton in a casing of a watch.

20. A method of manufacturing a series of watches as claimed in claim 1, comprising:

assigning a unique decoration code to each of the watches in the series, and producing the series of watches, wherein each of the watches in the series comprises at least one decorative element that differs from the decorative elements of the other watches in the series.

21. The watch as claimed in claim 1, wherein each of the decorative components is different from the other decorative components in material and/or color.

22. The watch as claimed in claim 1, wherein the first support surface of each of the plurality of openings extends around a periphery of the respective opening.

* * * * *